(12) United States Patent
Son et al.

(10) Patent No.: US 10,619,861 B2
(45) Date of Patent: Apr. 14, 2020

(54) COOKING DEVICE AND METHOD FOR PREVENTING COOKING DEVICE FROM OVERHEATING

(71) Applicant: Samsung Electronics Co., Ltd., Suwon-si (KR)

(72) Inventors: Chang-hyun Son, Hwaseong-si (KR); Sung-soo Park, Hwaseong-si (KR); Yo-jin Seo, Suwon-si (KR); Sung-min Oh, Suwon-si (KR); Se-min Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 302 days.

(21) Appl. No.: 15/699,357

(22) Filed: Sep. 8, 2017

(65) Prior Publication Data

US 2018/0073740 A1 Mar. 15, 2018

(30) Foreign Application Priority Data

Sep. 9, 2016 (KR) .................... 10-2016-0116609

(51) Int. Cl.
*H05B 1/02* (2006.01)
*F24C 7/08* (2006.01)
*H02P 29/60* (2016.01)
*F24C 15/00* (2006.01)

(52) U.S. Cl.
CPC .............. *F24C 7/087* (2013.01); *F24C 7/082* (2013.01); *H02P 29/60* (2016.02); *H05B 1/0261* (2013.01); *F24C 15/006* (2013.01)

(58) Field of Classification Search
CPC . F24C 7/087; H02P 29/60; H05B 1/02; H05B 1/0261; H05B 1/0263; H05B 1/0266; H05B 3/0036
USPC .......................... 219/505, 494, 497, 481, 492
See application file for complete search history.

(56) References Cited

U.S. PATENT DOCUMENTS

| 9,816,710 B2 * | 11/2017 | Billman ..................... F24F 1/00 |
| 2008/0237217 A1 * | 10/2008 | Helt ..................... F24D 19/1009 |
| | | 219/485 |
| 2009/0189559 A1 * | 7/2009 | Li ........................ A47J 43/0705 |
| | | 318/434 |
| 2010/0065355 A1 * | 3/2010 | Reddy ...................... B60K 1/02 |
| | | 180/65.31 |
| 2014/0175079 A1 | 6/2014 | Schjerven, Sr. et al. |
| 2016/0056622 A1 | 2/2016 | Hamilton et al. |

FOREIGN PATENT DOCUMENTS

| KR | 20-2000-0008735 | 5/2000 |
| KR | 2000-0008735 | 5/2000 |
| KR | 20-0189004 | 7/2000 |

* cited by examiner

*Primary Examiner* — Mark H Paschall
(74) *Attorney, Agent, or Firm* — Staas & Halsey LLP (57) ABSTRACT

A cooking device is provided. The cooking device supplied with power through an AC power supply including a neutral line includes: a motor configured to drive a cooling fan; a main board mounted with a plurality of components for an operation of the cooking device; and a thermal protector having one end connected to the neutral line of the AC power supply and the other end commonly connected to the motor and the main board, wherein the thermal protector cuts off connection between the neutral line and the main board through the thermal protector if a temperature of the motor is equal to or higher than a predetermined value.

14 Claims, 6 Drawing Sheets

COOKING DEVICE AND METHOD FOR PREVENTING COOKING DEVICE FROM OVERHEATING

CROSS-REFERENCE TO RELATED APPLICATIONS

This application claims priority from Korean Patent Application No. 10-2016-0116609, filed on Sep. 9, 2016 in the Korean Intellectual Property Office the disclosure of which is incorporated herein by reference in its entirety.

BACKGROUND OF THE INVENTION

Field of the Invention

Apparatuses and methods consistent with present disclosure relate to a cooking device and a method for preventing a cooking device from overheating, and more particularly, to a cooking device having a cooling fan and a method for preventing a cooking device from overheating.

Description of the Related Art

A variety of cooking devices such as a microwave oven, an electric range, and various ovens that may heat food to cook the food generally have a cooling fan and thus may be prevented from overheating.

At this time, the cooling fan may be constrained for reasons such as foreign matters stuck to a shaft in a situation in which the cooling fan of the cooking device should be operated. In this case, products are not properly cooled to be overheated and therefore various components including a cooling motor may be damaged.

As such, in order to prevent the cooling motor from being damaged in the case where the cooling fan is constrained, techniques for installing a thermal protector in the cooling motor to cut off power supplied to the cooling motor during an overload have been developed.

However, this merely prevents damage to the cooling motor and therefore has a limitation in protecting the cooking device from overheating. Accordingly, techniques for protecting the cooking device from overheating by appropriately disposing a thermal cut out (TCO), using a hall sensor or the like have been developed but require separate devices or circuits, which is inappropriate in costs or miniaturization.

Therefore, if the cooling fan of the cooking device is constrained, techniques capable of effectively preventing the cooking device from overheating by using a minimum number of components and preventing a fire due to the overheating are required.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present disclosure provides a cooking device and a method for preventing a cooking device from overheating capable of effectively preventing the overheating when a cooling motor is constrained.

According to an aspect of the present invention, a cooking device supplied with power through an AC power supply including a neutral line includes: a motor configured to drive a cooling fan; a main board mounted with a plurality of components for an operation of the cooking device; and a thermal protector having one end connected to the neutral line of the AC power supply and the other end commonly connected to the motor and the main board, in which the thermal protector may cut off connection between the neutral line and the main board through the thermal protector if a temperature of the motor is equal to or higher than a predetermined value.

The main board may include a neutral line terminal connected to the other end of the thermal protector to be supplied with the AC power, and the thermal protector may be turned off if the temperature of the motor is equal to or higher than a predetermined value to cut off AC power supplied to the main board through the thermal protector.

The main board may include a photocoupler connected to the other end of the thermal protector to detect whether to cut off the AC power supplied to the motor through the thermal protector.

The cooking device may further include: a processor configured to restrict an operation of the cooking device if the photocoupler detects that the AC power supplied to the motor is cut off.

The cooking device may further include a heater configured to generate heat, wherein the processor may restrict the operation of the cooking device by cutting off the power supplied to the heater, if the photocoupler detects that the AC power supplied to the motor is cut off.

The processor may restrict the operation of the cooking device by cutting off the AC power supplied to the main board.

The cooking device may further include: a display; and a processor configured to control the display to display an error message if the photocoupler detects that the AC power supplied to the motor is cut off.

The thermal protector may be disposed in the motor.

According to another aspect of the present invention, a method for preventing a cooking device that includes a motor configured to drive a cooling fan and a main board mounted with a plurality of components and is supplied with power through an AC power supply including a neutral line from overheating includes: operating the cooking device in a mode of operating a cooling fan included in the cooking device; and cutting off connection between the neutral line of the AC power supply and the main board using a thermal protector in the mode if a temperature of the motor is equal to or higher than a predetermined value, in which the thermal protector may have one end connected to the neutral line and the other end commonly connected to the motor and the main board.

The main board may include a neutral line terminal connected to the other end of the thermal protector to be supplied with the AC power, and in the cutting off, the thermal protector may be turned off to cut off the AC power supplied to the main board, if the temperature of the motor is equal to or higher than a predetermined value.

The main board may include a photocoupler connected to the other end of the thermal protector to detect whether to cut off the AC power supplied to the motor through the thermal protector.

The method may further include: restricting an operation of the cooking device if it is detected that the AC power supplied to the motor is cut off by the photocoupler.

The cooking device may further include a heater configured to generate heat, in which in the restricting, the power supplied is cut off to the heater to restrict the operation of the cooking device, if the photocoupler detects that the AC power supplied to the motor is cut off.

In the restricting, the AC power supplied to the main board may be cut off to restrict the operation of the cooking device.

The method may further include: displaying an error message if the photocoupler detects that the AC power supplied to the motor is cut off.

The thermal protector may be disposed in the motor.

As described above, according to various exemplary embodiments of the present invention, it is possible to effectively prevent the cooking device from overheating when the cooling motor is constrained and prevent a fire due to the overheating.

BRIEF DESCRIPTION OF THE DRAWING FIGURES

The above and/or other aspects of the present invention will be more apparent by describing certain exemplary embodiments of the present invention with reference to the accompanying drawings, in which.

DETAILED DESCRIPTION OF THE EXEMPLARY EMBODIMENTS

When it is determined that the detailed description of the known art related to the present invention may unnecessarily obscure the gist of the present invention, the detailed description thereof will be omitted. Terms "units" for components used in the following description are used only in order to easily make a specification. Therefore, the above-mentioned terms do not have meanings or roles that distinguish from each other in themselves.

Terms used in the present specification are used only in order to describe specific exemplary embodiments rather than limiting the present disclosure. Singular forms used herein are intended to include plural forms unless context explicitly indicates otherwise.

Throughout this specification, it will be understood that the terms "comprise", "have" or the like in the present specification specify the presence of features, numbers, steps, operations, components, parts, or combinations thereof described in the specification, but do not preclude the presence or addition of one or more other features, numbers, steps, operations, components, parts, or combinations thereof.

Hereinafter, various exemplary embodiments of the present invention will be described in detail with reference to the accompanying drawings.

Figure 1:
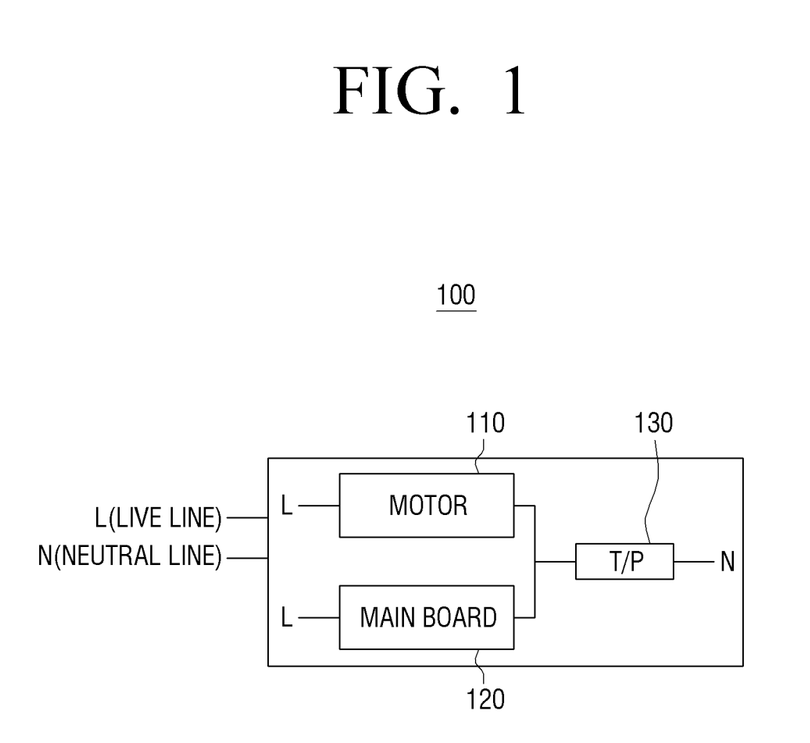
FIG. 1 is a block diagram illustrating a configuration of a cooking device according to an exemplary embodiment of the present disclosure.

FIG. 1 is a block diagram illustrating a configuration of a cooking device according to an exemplary embodiment of the present disclosure. Referring to FIG. 1, a cooking device 100 includes a motor 110, a main board 120, and a thermal protector (T/P) 130.

The motor 110 drives a cooling fan (not illustrated). For example, the motor 110 includes a shaft (not illustrated), in which as the motor 100 rotates, a cooling fan (not illustrated) connected to the shaft rotates. However, an example in which the motor 110 drives the cooling fan is not limited thereto.

Various components for operating the cooking device 100 may be mounted on the main board 120. For example, a processor (not illustrated) for controlling the overall operation of the cooking device 100 may be mounted on the main board 120, and various components for controlling operations of various components of the cooking device 100 such as a display (not illustrated) for displaying texts or images, a heater (not illustrated) for generating heat to cook food, or a motor 110 may be mounted on the main board 120. In addition, the main board 120 may include a power converter such as a switched mode power supply (SMPS) that converts applied AC power into DC power, but it is not limited thereto.

The cooking device 100 is supplied with power through an AC power supply including a live line L and a neutral line N. Here, the AC power supply may be a single-phase AC power supply. Meanwhile, in order to operate the motor 110 and the main board 120, AC power needs to be supplied to the motor 110 or the main board 120, respectively. For this purpose, the motor 110 and the main board 120 are connected to the live line L and the neutral line N, respectively.

Accordingly, the cooking device 100 may appropriately drive the motor 110 when performing functions of generating heat such as a cooking function or a self-cleaning function, thereby preventing a product from overheating.

However, the motor 110 may be constrained for reasons such as foreign matters stuck to the shaft in a situation in which the motor 110 should be operated. In this case, since power is continuously supplied to the motor 110, the cooling fan is not operated and therefore the entire cooking device 100 overheats as well as the motor 110 turns into an overload state and therefore heat is generated in the motor 110. Therefore, the motor 110 or the components mounted on the main board may be damaged, and in severe cases, a fire may occur.

To prevent this, various embodiments of the present disclosure use a thermal protector 130. Here, the thermal protector 130 is a kind of overheat protection device, and may mean an element that may be operated at a certain temperature or higher so that both ends thereof are disconnected from each other whatever it is called. That is, both ends of the thermal protector 130 are connected to each other at a normal temperature, but if the temperature becomes a specific temperature or higher, the thermal protector 130 may be broken and thus both ends thereof may be disconnected from each other. At this time, the thermal protector 130 may be a fuse type in which both ends are not again connected to each other once they are broken, or may be a bimetal type in which both ends are again connected to each other if the temperature is lower than a predetermined temperature. On the other hand, the thermal protector 130 may for example be designed to be operated at 170° C., but it is not limited thereto.

Particularly, as illustrated in FIG. 1, the neutral line N may be connected to the motor 110 and the main board 120 through the thermal protector 130. Specifically, according to an exemplary embodiment of the present disclosure, one end of the thermal protector 130 may be connected to the neutral line N of the power supply, and the other end thereof may be commonly connected to the motor 110 and the main board 120. Accordingly, the motor 110 and the main board 120 may each be connected to the neutral line N of the power supply through the thermal protector 130.

That is, unless the thermal protector 130 is broken, the motor 110 and the main board 120 may be each connected to the live line L and the neutral line N of the power supply and thus may be operated by being supplied with power.

On the other hand, according to the exemplary embodiment of the present disclosure, the thermal protector 130 may be operated based on the temperature of the motor 110. To this end, the thermal protector 130 may be disposed inside the motor 110 to be directly supplied with heat generated from the motor 110. However, the present invention is not limited thereto, and even if the thermal protector 130 is disposed outside the motor 110, the thermal protector 130 is designed to be operated at a relatively low temperature in consideration of the temperature difference with the case where the thermal protector 130 is disposed inside the motor 110, such that the thermal protector 130 may be operated according to the temperature of the motor 110.

Accordingly, if the temperature of the motor 110 is a predetermined value or higher, the thermal protector 130 may be turned off to disconnect between the neutral line N and the motor 110 and between the neutral line N and the main board 120.

By the above configuration, when the motor 110 of the cooking device 100 is constrained and thus the cooking device 100 is not cooled, it is possible to effectively prevent the cooking device 100 from overheating with a minimum number of components and prevent a damage to component or a fire due to the overheating.

Specifically, the neutral line N connected to the motor 110 through the thermal protector 130 is used together with the neutral line N for supplying power to the main board 120, and as a result when the motor 110 is constrained and thus the power supply is cut off, the power supply of the main board 120 may be cut off as well. Accordingly, it is possible to effectively prevent the cooking device 100 from overheating due to the constraint of the motor 110 without separate components such as the TCO or the hall sensor.

In addition, various embodiments to restrict the operation of the cooking device 100, displaying an error message or the like by detecting whether to cut off the power supply of the motor 110 using the neutral line N connected to the main board 120 through the thermal protector 130 may be configured.

Hereinafter, various embodiments of the present disclosure will be described in more detail with reference to FIGS. 2 and 3. In the description with reference to FIGS. 2 and 3, the same components as that described above will not be described. In addition, the example in which the thermal protector 130 is disposed inside the motor 110 will be described with reference to FIGS. 2 and 3, but the fact that the present embodiment is not limited thereto is as described above.

Figure 2:
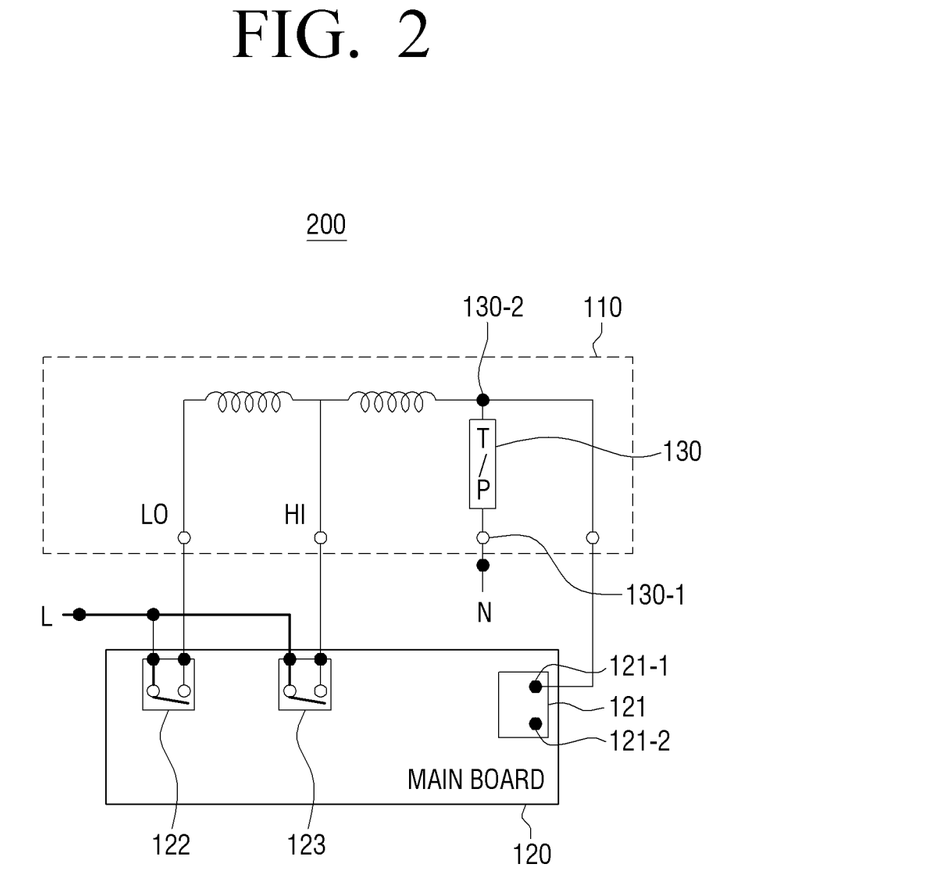
FIG. 2 is a block diagram illustrating in detail the configuration of the cooking device according to the exemplary embodiment of the present disclosure.

FIG. 2 is a diagram for explaining an exemplary embodiment in which the neutral line N connected to the motor 110 through the thermal protector 130 is used as a power supply line for the operation of the main board 120. Referring to FIG. 2, a cooking device 200 includes a motor 110, a main board 120, and a thermal protector (T/P) 130.

As illustrated in FIG. 2, the motor 110 is connected to a live line L through switches 122 and 123 mounted on the main board 120 and is connected to a neutral line N through the thermal protector 130 to be supplied with AC power for an operation.

The motor 110 may be operated in two modes (an LO mode operated at a relatively low revolution per minute (RPM) and an HI mode operated at a relatively higher RPM than the LO mode), and a processor (not illustrated) included in the main board 120 controls the switches 122 and 123 to adjust the connection of the live line L so that the motor 110 may be operated in the LO mode or the HI mode. However, it should be understood that this is only an exemplary embodiment, and the motor 110 may have only one operation mode or three or more operation modes.

Meanwhile, the main board 120 may include a power supply terminal 121 to be supplied with AC power. At this time, the power supply terminal 121 may include a neutral line terminal 121-1 to which the neutral line N is connected through the thermal protector 130. That is, when one end 130-1 of the thermal protector 130 is connected to the neutral line N and the other end 130-2 thereof is connected to the motor 110, the neutral line terminal 121-1 may be connected to the other end 130-2 of the thermal protector 130.

At this time, no line may be connected to the remaining terminal 121-2 of the power supply terminal 121 because the main line 120 is already connected (represented by a thick dot) to the live line L as illustrated. However, the present invention is not limited thereto, and the remaining terminal 121-2 of the power supply terminal 121 may be grounded according to the exemplary embodiment. In this way, the live line L and the neutral line N are also connected even to the main board 120 to supply power.

In such a structure, if the temperature of the motor 110 is equal to or higher than a predetermined value and thus the thermal protector 130 is turned off, the neutral line N connected to the motor 100 and the main board 120 through the thermal protector 130 is also disconnected from the motor 100 and the main board 120. As a result, the AC power supplied to the motor 110 and the main board 120 may be cut off.

As described above, the cooking device 200 overheats when the cooling fan of the cooking device needs to be operated, for example, when the cooling fan is constrained for reasons such as foreign matters stuck to the shaft during the operation of the cooking function or the self-cleaning function.

That is, the cooking device 200 continuously generates heat by operating the heater (not illustrated) for cooking food or cleaning the cooking device 200 during the operation of the cooking function or the self cleaning function. At this time, the cooling fan needs to be operated to prevent overheating. However, the motor 110 is constrained and thus the cooling fan is not operated, such that the cooking device 200 overheats. In addition, aside from the fact that the motor 110 is physically constrained, power is continuously supplied to operate the motor 110 and therefore the motor 110 turns into an overload state, such that heat is generated in the motor.

At this time, according to one exemplary embodiment of the present invention described above, if the motor 110 becomes a predetermined temperature or higher, the thermal protector 130 is turned off and thus the power supplied to the motor 110 which turns into an overload state is cut off, such that it is possible to prevent the motor 110 from being damaged due to the overheating. In addition, the power supplied to the main board 120 is also cut off at the same time as the power supplied to the motor 110 is cut off and therefore it is possible to prevent the entire cooking device 200 including components mounted on the main board 120 from being damaged due to the overheating.

Figure 3:
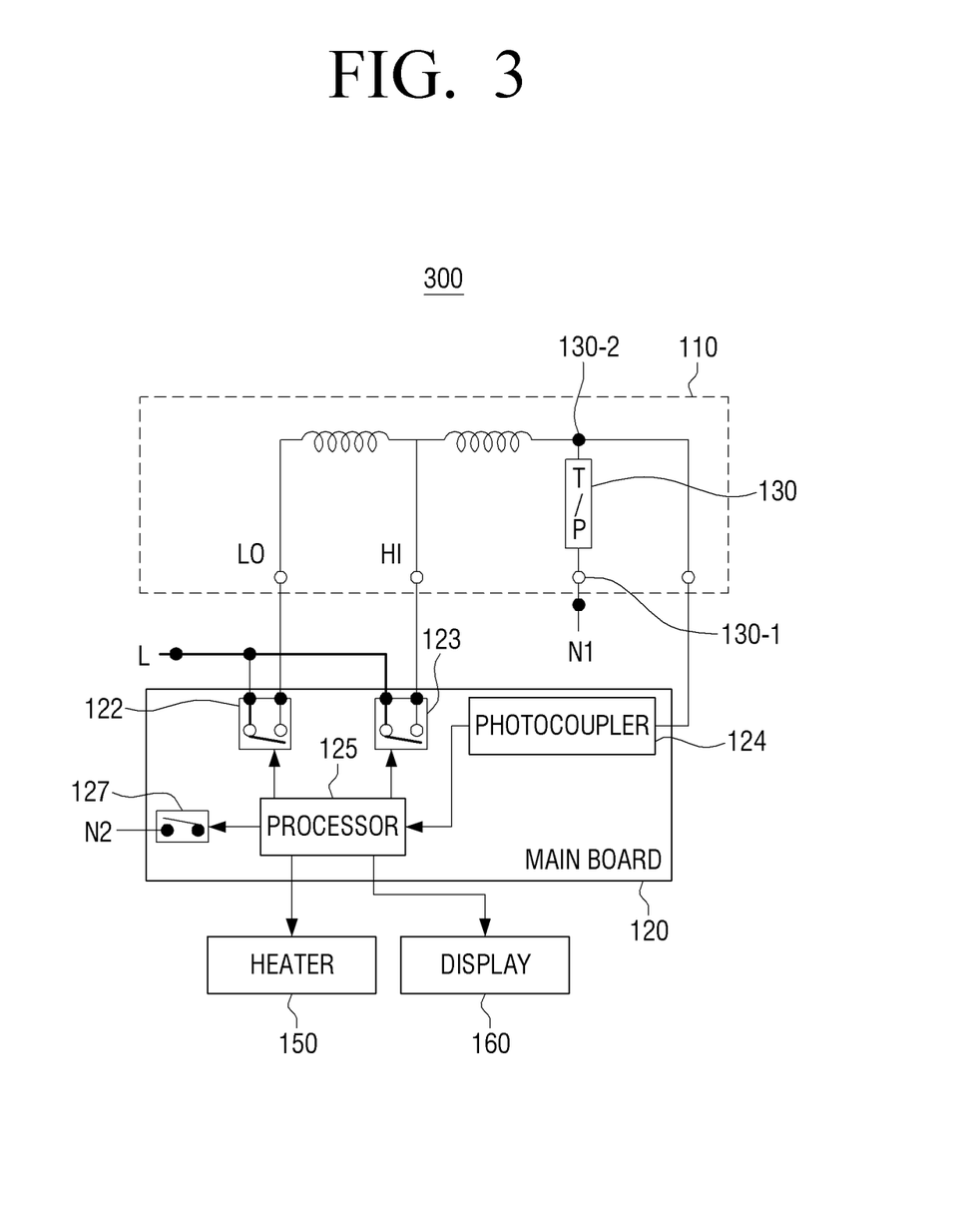
FIG. 3 is a block diagram illustrating in detail a configuration of a cooking device according to another exemplary embodiment of the present disclosure.

FIG. 3 is a view illustrating an exemplary embodiment in which it is detected whether to cut off the power to the motor 110 using the neutral line N connected to the main board 120 through the thermal protector 130 and the detected result is used. Referring to FIG. 3, a cooking device 300 may include a motor 110, a main board 120, a thermal protector (T/P) 130, a heater 150, and a display 160.

The heater 150 generates heat during the cooking function or the self-cleaning function of the cooking device 300. Here, the cooking function refers to the original function of the cooking device 300 that heats food to cook the food, and the self-cleaning function refers to a function of getting the cooking device 300 itself cleaned using steam or heat that the cooking device 300 generates. To this end, the heater 150 may include various heating elements, magnetrons or the like that may be supplied with electricity to generate heat.

The display 160 displays texts or images. In particular, the display 160 may display an error message or a warning message at the time of a malfunction or the overheating of the cooking device 300. For this purpose, the display 160 may be implemented as a liquid crystal display panel (LCD), light emitting diodes (LEDs), organic light emitting diodes (OLEDs), or the like, but is not limited thereto.

The motor 110 is connected to a live line L through switches 122 and 123 mounted on the main board 120 and is connected to a neutral line N1 through the thermal protector 130 to be supplied with AC power for an operation. Specifically, one end 130-1 of the thermal protector 130 is connected to the neutral line N1, and the other end 130-2 thereof is connected to the motor 110 to connect the neutral line N1 to the motor. Accordingly, if the thermal protector 130 is turned off, power supplied to the motor 110 is cut off.

At this time, the other end 130-2 of the thermal protector connected to the neutral line N1 is also connected to the main board 120 as in the exemplary embodiment of FIG. 2. However, in the exemplary embodiment with reference to FIG. 3, the neutral line N1 connected to the main board 120 through the thermal protector 130 is not used to supply power to the main board 120 but is used to detect whether to cut off the power to the motor 110.

To this end, the main board 120 is connected to a neutral line N2 separately from the neutral line N1, and is supplied with power for an operation. Specifically, both of the neutral line N1 and the neutral line N2 are lines that are connected to the neutral line N of power initially applied to the cooking device 300, but the neutral line N2 is connected to the main board 120 without passing through the thermal protector 130. Therefore, even if the thermal protector 130 is turned off, the neutral line N2 is not disconnected from the main board 120.

For example, the neutral line N2 may be connected to the main board 120 at a stage before the neutral line N applied to the cooking device 300 is connected to the one end 130-1 of the thermal protector 130, but the present invention is not limited thereto. Meanwhile, the live line L is connected (represented by a thick dot) to the main board 120 as illustrated.

Meanwhile, in order to detect whether to cut off the power to the motor 110, the main board 120 may include a photocoupler 124. The photocoupler 124 is an element that transmits a signal using light, and may convert an AC signal into a DC signal and output the DC signal.

According to one exemplary embodiment of the present disclosure, the photocoupler 124 is connected to the other end 130-2 of the thermal protector 130 and is connected to the neutral line N1 through the thermal protector 130. Accordingly, the photocoupler 124 may receive the AC signal through the neutral line N1 and output the DC signal corresponding to the AC signal to the processor 125.

At this time, if the temperature of the motor 110 becomes a predetermined value or higher, the thermal protector 130 is turned off and thus the power supplied to the motor 110 is cut off. At the same time, the alternating signal through the neutral line N1 input to the photocoupler 124 is also cut off, such that an output signal of the photocoupler 124 is also cut off.

Accordingly, the processor 125 may detect whether to cut off the AC power supplied to the motor 110 based on the change in the output signal of the photocoupler 124.

The processor 125 controls an overall operation of the cooking device 300. In particular, the processor 125 may use the photocoupler 124 to detect whether to cut off the AC power supplied to the motor 110 as described above. As a result, if it is detected that the AC power supplied to the motor 110 is cut off, the processor 125 can restrict the operation of the cooking device 300.

For example, if the cut off of the AC power supplied to the motor 110 is detected in the mode (for example, a cooking mode or a self-cleaning mode) of operating the motor 110, the processor 125 may restrict the operation of the heater 150. Specifically, the processor 125 may forcibly terminate the cooking mode or the self-cleaning mode, thereby limiting the operation of the cooking device 300.

However, the exemplary embodiment of the present invention is not limited thereto. For example, the processor 125 may cut off the power supplied to the heater 150 to restrict the cooking operation and the self-cleaning operation of the cooking device 300. In this case, the heater 150 may be designed to be supplied with power through a switch (not illustrated) which is under the control of the processor 125.

Hereinabove, the example in which the processor 125 detects the cut off of the AC power supplied to the motor 110 to restrict the operation of the heater 150 is described, but the present invention is not limited thereto. According to the exemplary embodiment of the present invention, it goes without saying that the operation of other components that may be included in the cooking device 300 such as the display 160 may be limited.

Meanwhile, if the AC power supplied to the motor 110 is detected, the processor 125 may cut off the AC power supplied to the main board 120 to limit the operation of the cooking device 300. Specifically, according to the exemplary embodiment of the present invention, as shown in FIG. 3, a switch 127 capable of turning on/off the connection with the above-described neutral line N2 may be mounted on the main board 120.

Therefore, if the cooking device 300 is in a normal state, the main board 120 and the neutral line N2 are connected to each other through the switch 127 to supply power to the main board 120, but if the temperature of the motor 110 is a predetermined value or higher and thus the cut off of the AC power supplied to the motor 110 is detected, the processor 125 may turn off the switch 127 to cut off the power supplied to the main board 120. Accordingly, if the power supplied to the main board 120 is cut off, the entire power of the cooking device 100 is cut off and thus the entire operation thereof can be restricted.

Meanwhile, according to the exemplary embodiment of the present disclosure, the processor 125 may control the display 160 to display an error message if the cut off of the AC power supplied to the motor 110 is detected.

For example, the processor 125 may control the display 160 to display an error code corresponding to an abnormality of the operation of the motor 110 if it is detected that the AC power supplied to the motor 110 is cut off. At this time, the error code may be predefined for each malfunction type of the cooking device 300 but it is not limited thereto.

Also, the processor 125 may control the display 160 to display a warning message such as "The device is overheating. Please turn off the power" notifying that the cooling fan 110 is not operated.

Meanwhile, there may be the embodiment that the cooking device 300 includes a speaker (not illustrated) and the processor 125 controls a speaker (not illustrated) to generate a warning sound if it is detected that the AC power supplied to the motor 110 is cut off.

As described above, if the cooking device 300 overheats because the cooling fan is not operated due to the restriction of the motor 110, the operation of the cooking device 300 may be automatically restricted or a user is induced to cut off the power to the cooking device 300 through the warning message, such that it is possible to prevent the components of the cooking device 300 from being damaged or a fire from occurring.

In the above description, the case in which the neutral line N of the single-phase AC power supply is connected to the motor 110 and the main board 120 through the thermal protector 130 is described by way of example. However, in the case of the single-phase AC power supply, even if the live line L and the neutral line N are changed to each other to be connected to the cooking devices 100, 200, and 300, the cooking devices 100, 200, and 300 may be operated. Even in this case, it will be apparent to those skilled in the art that the technical idea of the present disclosure may be applied as it is.

Further, in the above description, the case in which the power supplied to the cooking device 100 is a single-phase AC power is described by way of example, but the present invention is not necessarily limited thereto. For example, even when the technical idea according to the present disclosure may be applied even to the three-phase AC power supply in which only one phase (single phase) is connected to the cooking devices 100, 200, and 300.

Figure 4:
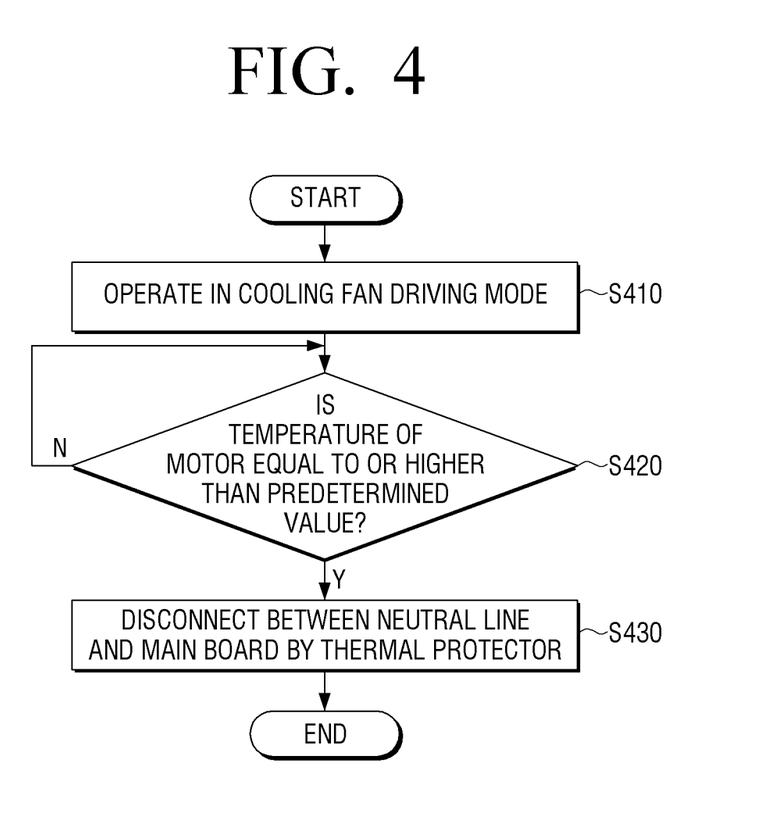
FIG. 4 is a flowchart illustrating a method for preventing a cooking device for overheating according to an exemplary embodiment of the present disclosure.

FIG. 4 is a flowchart illustrating a method for preventing cooking devices 100, 200, and 300 for overheating according to an exemplary embodiment of the present disclosure. Here, the cooking devices 100, 200, and 300 are various kinds of cooking devices that heats food to cook the food and may include various ovens, microwave ovens, electric ovens, or the like. Meanwhile, the cooking devices 100, 200, and 300 include the main board mounted with a plurality of components for the operation thereof, and may be supplied with power through the AC power supply including the neutral line.

Referring to FIG. 4, the cooking devices 100, 200, and 300 may be operated in a cooling fan driving mode that drives the cooling fans provided in the cooking devices 100, 200, and 300 (S410). Here, the cooling fan driving mode is a mode required to cool the cooking devices 100, 200, and 300, and may a cooking mode that generates heat to cook food or a self-cleaning mode that generates heat or steam or perform a self cleaning function, but the present invention is not limited thereto.

At this time, the cooking devices 100, 200, and 300 sense the temperature of the motor (S420), and if the temperature of the motor is equal to or higher than a predetermined value (S420, Y), the neutral line and the main board may be disconnected from each other through the thermal protector (S430). To this end, the thermal protector may have one end connected to the neutral line applied to the cooking devices 100, 200, and 300 and the other end commonly connected to the motor and the main board.

Figure 5:
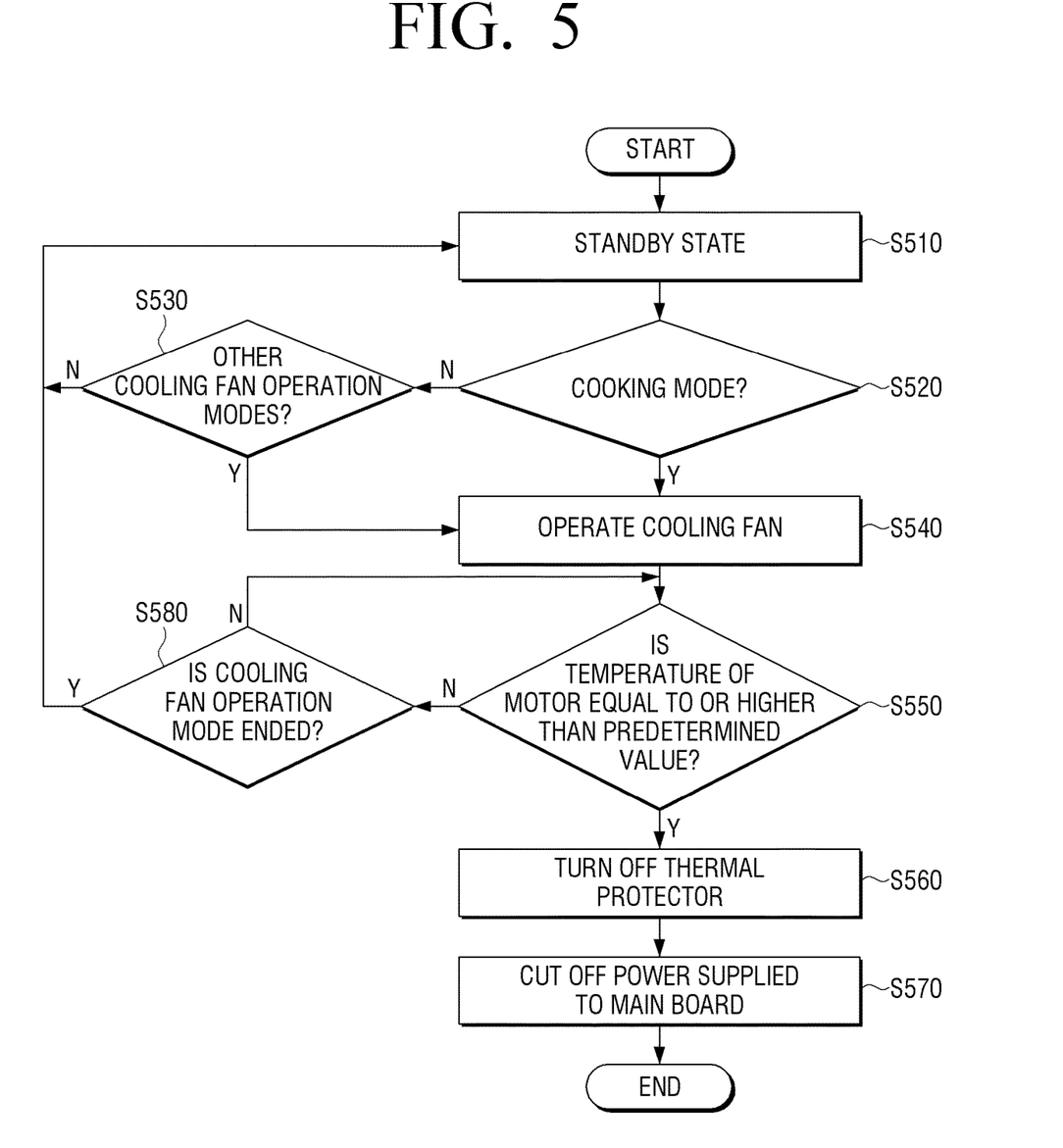
FIG. 5 is a flowchart illustrating in detail the method for preventing a cooking device for overheating according to the exemplary embodiment of the present disclosure.

FIG. 5 is a flowchart illustrating in detail the method for preventing a cooking device 200 for overheating according to an exemplary embodiment of the present disclosure. The cooking device 200 may use the neutral line N connected to the motor through the thermal protector as the neutral line N for supplying power to the main board, and as a result when the motor 110 is constrained and thus the power supply is cut off, the power supply of the main board 120 may be cut off as well.

Referring to FIG. 5, the cooking device 200 enters a standby state after power is applied (S510). At this time, if the cooking device 200 enters the cooking mode according to according to the user's operation (S520, Y) or the cooking device 200 enters other cooling fan operation modes such as the self-cleaning mode even if the cooking device 200 is not the cooking mode (S520, N and S530, Y), the cooking device 200 operates the cooling fan (S540).

If the cooking device 200 does not enter the cooking mode and does not enter the cooling fan operation mode (S520, N and S530, N), the cooking device 200 is in the standby state (S510).

If the motor driving the cooling fan is constrained during the operation of the cooling fan and thus the temperature of the motor is equal to or higher than a predetermined value (S550, Y), the thermal protector of the cooking device 200 is turned off (S560), such that the power supplied to the main board may be cut off (S570).

To this end, the thermal protector may have one end connected to the neutral line applied to the cooking device 200 and the other end commonly connected to the neutral line terminal of the motor and the main board. Here, the neutral line terminal is a terminal to which the neutral line N of the live line L and the neutral line N that need to be connected to the main board for supplying AC power is connected.

If the temperature of the motor is less than a predetermined value (S550, N), the cooking device 200 determines whether the cooling fan operation mode has been terminated (S580). If it is determined that the cooling fan operation mode is terminated (S580, Y), the cooking device enters the standby state (S510) and if it is determined that the cooling fan operation mode is not terminated (S580, N), the motor temperature is continuously detected (S550).

Figure 6:
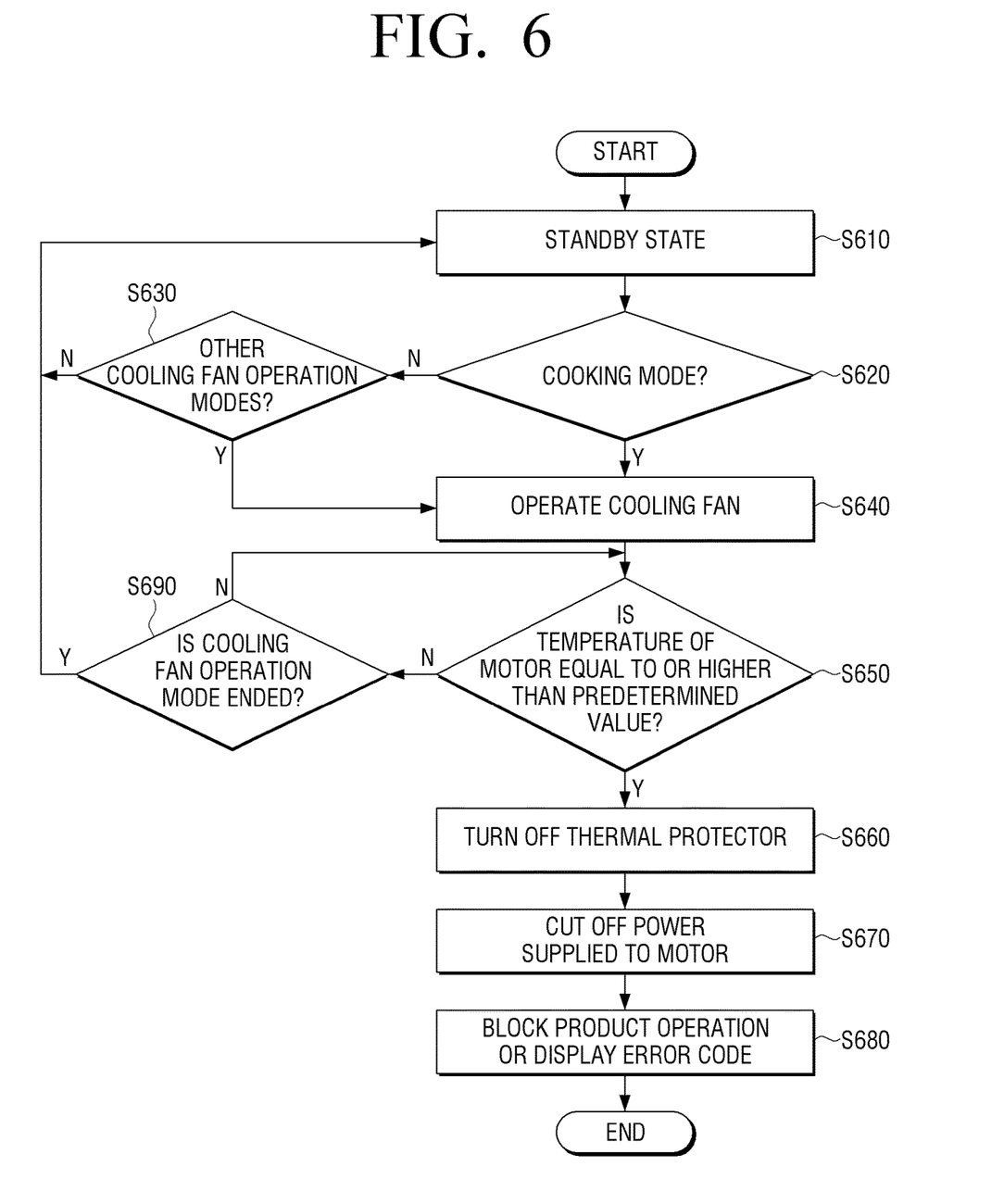
FIG. 6 is a flowchart illustrating in detail a method for preventing a cooking device for overheating according to another exemplary embodiment of the present disclosure.

FIG. 6 is a flowchart illustrating in detail the method for preventing a cooking device 300 for overheating according to another exemplary embodiment of the present disclosure. The cooking device 300 may detect whether to cut off the power to the motor 110 to thereby restrict the operation of the cooking device 300 or display the error message.

Referring to FIG. 6, the cooking device 300 enters a standby state after power is applied (S610). At this time, if the cooking device 300 enters the cooking mode according to according to the user's operation (S620, Y) and the cooking device 200 enters other cooling fan operation modes such as the self-cleaning mode even if the cooking device is not the cooking mode (S620, N and S630, Y), the cooking device 300 drives the motor to operate the cooling fan (S640).

If the cooking device 300 does not enter the cooking mode and does not enter the cooling fan operation mode (S620, N and S630, N), the cooking device 300 is in the standby state (S610).

If the motor driving the cooling fan is constrained during the operation of the cooling fan and thus the temperature of the motor is equal to or higher than a predetermined value (S650, Y), the thermal protector of the cooking device 300 is turned off (S660), thereby detecting that the AC power supplied to the motor is cut off (S670). Specifically, the cooking device 300 can detect whether the temperature of the motor is equal to or higher than a predetermined value by using the photocoupler that detects whether to cut off the AC power supplied to the motor through the thermal protector. To this end, the photocoupler may be connected to the neutral line through the thermal protector.

In this way, if it is detected that the power supplied to the motor is cut off, the cooking device 300 may restrict the operation of the cooking device 300 or display the error message (S680). For example, the cooking device 300 may block the overall operation of the product or may block the operation of some components. Further, the cooking device 300 may also display an error code or warning message.

If the temperature of the motor is less than a predetermined value (S650, N), the cooking device 300 determines whether the cooling fan operation mode has been terminated (S690). If it is determined that the cooling fan operation mode is terminated (S690, Y), the cooking device enters the standby state (S610) and if it is determined that the cooling fan operation mode is not terminated (S690, N), the motor temperature is continuously detected (S650).

As described above, according to various exemplary embodiments of the present invention, it is possible to effectively prevent the cooking device from overheating when the motor for driving the cooling fan is constrained and prevent a fire due to the overheating. Specifically, if the cooling motor is constrained and thus the cooking device overheats, it is possible to instantaneously confirm the abnormality of the product or turn off the power of the product without requiring any additional device, thereby more effectively preventing the cooking device from being damaged and the fire of the cooking device from occurring. Further, if the wire connection of the cooling motor is not made, the overall operation of the product is impossible, such that the defect of the product can be easily detected during the manufacturing.

The spirit of the present disclosure has been just exemplified. It will be appreciated by those skilled in the art that various modifications and alterations can be made without departing from the essential characteristics of the present disclosure. Accordingly, the embodiments disclosed in the present invention and the accompanying drawings are used not to limit but to describe the spirit of the present invention. The scope of the present invention is not limited only to the embodiments and the accompanying drawings. The scope of the present disclosure should be interpreted by the following claims and it should be interpreted that all spirits equivalent to the following claims fall within the scope of the present disclosure.

What is claimed is:

1. A cooking device supplied with power through an AC power supply including a neutral line, comprising:
   a motor configured to drive a cooling fan;
   a main board mounted with a plurality of components for an operation of the cooking device; and
   a thermal protector having one end connected to the neutral line of the AC power supply and another end commonly connected to the motor and the main board,
   wherein the thermal protector cuts off connection between the neutral line and the main board through the thermal protector upon a temperature of the motor being equal to or higher than a predetermined value, and
   wherein the main board includes a photocoupler connected to the other end of the thermal protector to detect whether to cut off the AC power supplied to the motor through the thermal protector.

2. The cooking device as claimed in claim 1, wherein the main board includes a neutral line terminal connected to the other end of the thermal protector to be supplied with the AC power, and
   the thermal protector is turned off upon the temperature of the motor being equal to or higher than the predetermined value to cut off AC power supplied to the main board through the thermal protector.

3. The cooking device as claimed in claim 1, further comprising:
   a processor configured to restrict an operation of the cooking device upon the photocoupler detecting that the AC power supplied to the motor is cut off.

4. The cooking device as claimed in claim 3, further comprising:
   a heater configured to generate heat,
   wherein the processor restricts the operation of the cooking device by cutting off the power supplied to the heater, upon the photocoupler detecting that the AC power supplied to the motor is cut off.

5. The cooking device as claimed in claim 3, wherein the processor restricts the operation of the cooking device by cutting off the AC power supplied to the main board.

6. The cooking device as claimed in claim 1, further comprising:
   a display; and
   a processor configured to control the display to display an error message upon the photocoupler detecting that the AC power supplied to the motor is cut off.

7. The cooking device as claimed in claim 1, wherein the thermal protector is disposed in the motor.

8. A method for preventing a cooking device that includes a motor configured to drive a cooling fan and a main board mounted with a plurality of components and is supplied with power through an AC power supply including a neutral line from overheating, the method comprising:
   operating the cooking device in a mode of operating a cooling fan included in the cooking device; and
   cutting off connection between the neutral line of the AC power supply and the main board using a thermal protector in the mode upon a temperature of the motor being equal to or higher than a predetermined value,
   wherein the thermal protector has one end connected to the neutral line and another end commonly connected to the motor and the main board,
   wherein the main board includes a photocoupler connected to the other end of the thermal protector to detect whether to cut off the AC power supplied to the motor through the thermal protector.

9. The method as claimed in claim 8, wherein the main board includes a neutral line terminal connected to the other end of the thermal protector to be supplied with the AC power, and in the cutting off, the thermal protector is turned off to cut off the AC power supplied to the main board, upon the temperature of the motor being equal to or higher than the predetermined value.

10. The method as claimed in claim 8, further comprising:
restricting an operation of the cooking device upon detecting that the AC power supplied to the motor is cut off by the photocoupler.

11. The method as claimed in claim 10, wherein the cooking device further includes a heater configured to generate heat, and
wherein in the restricting, the power supplied to the heater is cut off to restrict the operation of the cooking device, upon the photocoupler detecting that the AC power supplied to the motor is cut off.

12. The method as claimed in claim 10, wherein in the restricting, the AC power supplied to the main board is cut off to restrict the operation of the cooking device.

13. The method as claimed in claim 8, further comprising:
displaying an error message upon the photocoupler detecting that the AC power supplied to the motor is cut off.

14. The method as claimed in claim 8, wherein the thermal protector is disposed in the motor.

* * * * *